United States Patent [19]

Shepperd

[11] 4,170,756
[45] Oct. 9, 1979

[54] VERSATILE TRANSCEIVER COUPLING NETWORK

[75] Inventor: Michael E. Shepperd, Indianapolis, Ind.

[73] Assignee: General Aviation Electronics, Inc., Indianapolis, Ind.

[21] Appl. No.: 789,333

[22] Filed: Apr. 18, 1977

[51] Int. Cl.$^2$ ............................................. H04B 1/40
[52] U.S. Cl. ...................................... 325/21; 325/22; 325/370
[58] Field of Search ............... 343/180, 175, 850, 857; 325/21, 22, 23, 178, 172, 128, 177, 370; 333/6, 7 R, 7 D, 8

[56] References Cited

U.S. PATENT DOCUMENTS

| | | | |
|---|---|---|---|
| 2,855,508 | 10/1958 | Barlow | 325/178 |
| 3,117,241 | 1/1964 | Paynter | 333/7 D |
| 3,162,809 | 12/1964 | Yax | 325/172 |
| 3,327,215 | 6/1967 | Battin | 343/180 |
| 3,328,694 | 6/1967 | Brady | 325/21 |
| 3,424,983 | 1/1969 | Schilb | 325/178 |
| 3,437,931 | 4/1969 | Schultz | 325/172 |
| 3,781,684 | 12/1973 | Inslerman | 325/21 |
| 4,055,807 | 10/1977 | Priniski | 325/21 |

Primary Examiner—Robert L. Griffin
Assistant Examiner—Michael A. Masinick
Attorney, Agent, or Firm—Gust, Irish, Jeffers & Rickert

[57] ABSTRACT

A network for connecting a receiver and a transmitter to a common antenna to utilize the antenna for both transmit and receive modes of operation is disclosed, which network is suitable for either relay antenna switching or solid state antenna switching. The network includes a band pass filter coupling the transmitter output to the antenna at least during the transmit mode of operation and first and second filter junction points for coupling the antenna to the receiver. One of the first and second junction points is coupled to the receiver at least during the receive mode of operation, and includes means for inhibiting the application of the transmitter output signal to the receiver during the transmit mode of operation. When the circuit employs an antenna switching relay, this relay, typically a single pole double-throw relay, has normally closed contacts coupling the second filter junction point to the receiver, and normally open contacts closable to complete the coupling of the transmitter output to the antenna only in the transmit mode of operation. When the network is employed for solid state antenna switching, the band pass filter continuously couples the transmitter output to the antenna and the first filter junction point includes a further filtering arrangement, the frequency characteristics of which are variable with the mode of operation to allow receipt of incoming signals in the receive mode, while inhibiting the application of transmitted signals to the receiver in the transmit mode.

6 Claims, 4 Drawing Figures

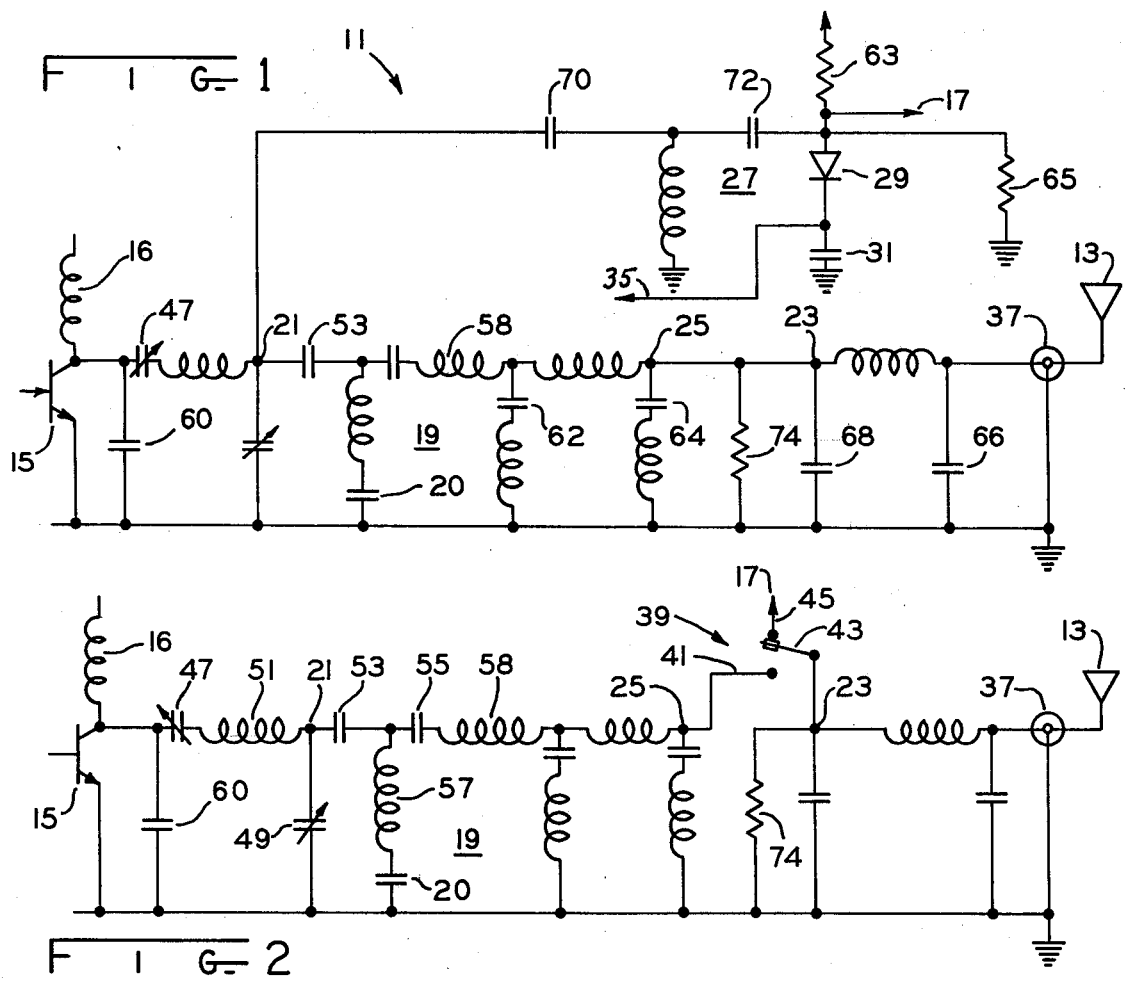
FIG. 1
FIG. 2
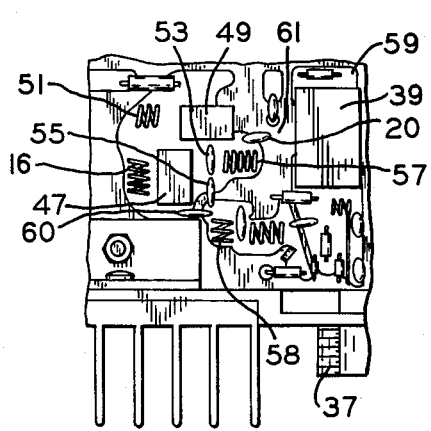
FIG. 3
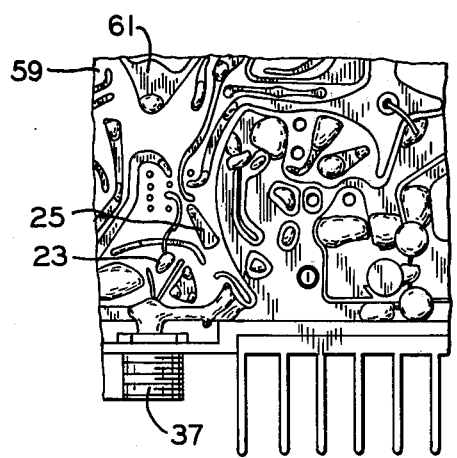
FIG. 4

VERSATILE TRANSCEIVER COUPLING NETWORK

BACKGROUND OF THE INVENTION

The present invention relates generally to antenna switching arrangements and more particularly to an antenna coupling network suitable for either relay or solid state antenna switching.

The use of a common antenna with a transceiver operating in either the transmit or receive mode is rather common, however, when both transmitter and receiver are operating on the same or nearly the same frequency, some provision is desirable to prevent the output of the transmitter feeding directly into the receiver to prevent feedback problems, as well as to prevent loading of the transmitter output and resultant transmitter inefficiency. The classic approach to this problem is to employ an antenna transfer relay. Such a relay would typically have normally closed contacts connecting the receiver input to the antenna and would be actuated, for example, by depression of the transmitter press-to-talk switch to disconnect the receiver input from the antenna and to couple the transmitter output to that antenna.

Solid state antenna transfer systems, or so-called T-R switches, have also been devised, and may, for example, include a controllable semiconductor device (or vacuum tube) which is normally operative as an amplifier stage to couple the antenna input to the receiver, but which in the transmit mode of operation is biased to either cut off, or at least substantially reduce the signal from the antenna to the receiver input. Back-to-back diodes connected directly across the receiver input have also been employed, which diodes are not detrimental to the very low level received signal from the antenna but which are rendered strongly conductive when the transmitter signal is present to effectively prevent the application of that transmitter signal to the receiver input.

An antenna switching relay is a relatively costly transceiver component. Costly also is the design and fabrication of totally different circuitry for each different transceiver model. Thus, if the same or similar circuitry components, printed circuit boards, and the like, may be used for several different transceiver models, for example having different frequency capabilities, substantial cost reduction may be achieved.

SUMMARY OF THE INVENTION

Among the several objects of this invention may be noted the provision of a more versatile transceiver circuit; the provision of a transceiver printed circuit board which may be employed in different transceiver models having different frequency capabilities; the provision of a network for connecting a receiver and a transmitter to a common antenna, which network may be employed for either relay antenna switching or semiconductor antenna switching; and the provision of a network including a band pass filter for coupling a transmitter output to an antenna having junction points for the optional inclusion of relay antenna switching or semiconductor antenna switching, as desired.

In general, a network in one form of the present invention includes a band pass filter coupling the transmitter output to the antenna at least during the transmit mode, with that band pass filter having first and second filter junction points for coupling the antenna to the receiver input, at least during the receive mode of operation, with the circuitry coupling one of the first and second junction points to the receiver, including means for inhibiting the application of the transmitter output signal to the receiver during the transmit mode of operation. The means for inhibiting includes optionally either one of an antenna switching relay and solid state circuitry.

BRIEF DESCRIPTION OF THE DRAWING

FIG. 1 is a schematic circuit diagram of a network for connecting a receiver and transmitter to a common antenna in one form of the invention;

FIG. 2 is a schematic circuit diagram illustrating the modification of the circuit of FIG. 1 to employ relay antenna switching;

FIG. 3 is a top view of a portion of a printed circuit board with the components of the circuit of FIG. 2 connected thereto; and FIG. 4 is a bottom view of the portion of the printed circuit board depicted in FIG. 3.

Corresponding reference numerals indicate corresponding parts throughout the several views of the drawing.

The exemplification set out herein illustrates an embodiment of the invention in one form thereof and such exemplification is not to be construed as limiting in any manner the scope of the invention.

DESCRIPTION OF THE PREFERRED EMBODIMENT

Considering first FIG. 1, a network 11 connects an antenna 13 to a transmitter output as represented by the transistor 15 and coil 16, and to a receiver input at 17, to utilize the antenna 13 for both transmit and receive modes of operation. A band pass filter 19 couples the transmitter output 15 to the antenna 13, during both the transmit and receive modes of operation. The band pass filter 19 has a first filter junction point or node 21 for coupling the antenna 13 to the receiver input 17, as well as a second filter junction point 23 for coupling the antenna to the receiver. In the implementation illustrated in FIG. 1, this second junction point 23 is wired to a third terminal 25 to continuously couple the transmitter output to the antenna, however, the second filter junction point 23 will be utilized in FIG. 2 for coupling the antenna to the receiver.

In FIG. 1, a further filter 27 couples the first junction point 19 to the receiver input 17, and includes a diode 29 and capacitor 31 for varying the frequency characteristics of the filter 27 to allow receipt of the incoming signals in the receive mode of operation, while inhibiting the application of transmitted signals to the receiver in the transmit mode of operation. The filter 27 comprises a T highpass filter, the frequency characteristics of which are varied by selectively bypassing the diode 29 to conduct in the transmit mode of operation and to not conduct in the receive mode of operation. This biasing may be achieved, for example, by connecting the line 35 to a conventional transmitter push-to-talk switch. In the receive mode, line 35 is at a sufficiently high positive level to reverse bias the diode 29, thereby effectively removing capacitor 31 from the filter 27. When the push-to-talk switch is actuated to place the transmitter in the transmit mode, the potential on line 35 is lowered and diode 29 becomes conductive, thereby introducing capacitor 31 between the receiver input 17 and ground to inhibit the application of the transmitter output to the receiver input.

In FIG. 2, the same band pass filter 19 couples the transmitter output 15 to the common antenna by way of coaxial connector 37, however, the first junction point 21 no longer couples the receiver and antenna. The connection between terminals 23 and 25 has been severed and replaced by the normally open contacts of a single-pole, double-throw relay 39. Thus, when the relay is not energized, contacts 41 and 43 are normally open, while contacts 43 and 45 are normally closed to connect the receiver input 17 and the antenna connector 37. Placing the transceiver in the transmit mode of operation, for example, by actuating a push-to-talk switch, energizes the actuating coil of relay 39, opening the normally closed contacts 43-45, and closing the normally open contacts 43-41, to disconnect the antenna (and the transmitter output) from the receiver, while coupling that transmitter output to the antenna.

As noted earlier, antenna switching relay 39 is a relatively costly item, and may further be a maintenance problem due to contact arcing, dirt and the like, and therefore, the diode switching arrangement illustrated in FIG. 1 is preferred. This diode switching arrangement performs well over a certain band of frequencies, however, as the frequency spectrum of the transmitter is expanded to include more and more channels, the fixed change in response characteristics of the filter 27 becomes inadequate to preclude the application of transmitter output signals to the receiver and accordingly resort is had to the relay switching arrangement illustrated in FIG. 2. The present invention provides for this design change, while maximizing the use of common components, including an identical printed circuit board, so as to allow the use of that board in varying transmitter designs resulting in high volume, lowcost production of the printed circuit board and components common to the several transmitter versions.

A portion of this common printed circuit board is depicted in FIGS. 3 and 4 from opposite sides, with the particular circuit components, which are not common, being those of the relay implementation of FIG. 2.

The printed circuit board is constructed according to known techniques to have an insulating board 59 with relatively thin conductive paths 61 of, for example, a layer of copper, adhering to opposite sides of the board, to provide the specific desired circuit connections for the transceiver.

Visible in FIG. 3 are the antenna switching relay, along with the variable capacitors 47 and 49, and several relatively small inductances, such as 51 and 57, which are air core coils of three to five turns. Similarly, several of the capacitors, such as 53 and 55, typically of the twenty to twenty-two picofarad range, are visible.

Comparing FIG. 4 to FIGS. 1 and 2, respectively, the wiring changes necessary to implement either relay switching or diode switching will be readily understood. For the diode switching arrangement of FIG. 1, the T filter 27 is connected to terminal 21, while terminals 23 and 25 are directly connected together. The mounting area occupied by the relay 39 in FIG. 3 provides sufficient area for the T filter 27, resistors 63, 65, diode 29, and capacitor 31. Alternatively, to implement the relay switching arrangement, terminal 21 no longer connects directly to a separate filter, and then to the receiver, but rather the receiver is coupled by way of the antenna switching relay 39 with the terminals 23 and 25 being only connected when the normally open contacts of that relay close. In other respects the circuit remains the same for implementing either switching arrangement.

For an exemplary marine band transceiver operating in the neighborhood of 150 MHz, diode switching as in FIG. 1 is preferred for narrow band operation such as a 1.5 MHz bandwidth for both receiver and transmitter, while relay switching as in FIG. 2 is more suitable for a bandwidth of, for example, 6 MHz in the receiver front end. In the latter example, a 2 MHz transmitter was employed. Exemplary circuit values for such transceivers are:

| Capacitors | Value in pf |
|---|---|
| 60 | 39 |
| 20, 53, 55, 62, 64, 66 | 22 |
| 68 | 1.8 |
| 31 | 100 |
| 70, 72 | 18 |
| Resistors | Value in K ohms |
| 74 | 10 |
| 63 | .820 |
| 65 | 3.9 |

From the foregoing it is now apparent that a novel electrical antenna switching arrangement has been provided meeting the objects and advantageous features set out hereinbefore as well as others, and it is contemplated that changes as to the components and arrangements of such a switching arrangement may be made by those having ordinary skill in the art without departing from the spirit of the invention or the scope thereof as set out by the claims which follow.

What is claimed is:

1. A network for connecting a receiver and a transmitter to a common antenna to utilize the antenna for both transmit and receive modes of operation comprising:

means coupling the transmitter output to the antenna at least during the transmit mode of operation including a portion of a printed circuit board;

a first junction point on the printed circuit board for coupling the antenna to the receiver input;

a second junction point on the printed circuit board distinct from the first junction point for coupling the antenna to the receiver input, the first and second printed circuit junction points being disposed intermediate the transmitter output and the antenna;

means connected directly to only one of the first and second junction points to couple the receiver input and the antenna at least during the receive mode of operation including means for inhibiting the application of the transmitter output signal to the receiver input during the transmit mode of operation; and a third terminal on the printed circuit board permanently coupled to the transmitter output, the third terminal permanently connected to the second printed circuit junction point only if the receiver input is coupled to the first printed circuit junction point whereas if the receiver input is coupled to the second printed circuit junction point only during the receive mode of operation then the third terminal of the printed circuit board is connected to the second printed circuit board junction point only during the transmit mode of operation.

2. The network of claim 1 wherein the coupling means continuously couples the transmitter output to the antenna, the connected means including filter means coupling the first junction point to the receiver input and means for varying the filter means frequency characteristics to allow receipt of incoming signals in the receive mode of operation while inhibiting the application of transmitted signals to the receiver in the transmit mode of operation.

3. The network of claim 2 wherein the means for varying comprises a diode and a capacitor connected in series between the receiver input and ground, and means selectively biasing the diode to conduct in the transmit mode of operation and to not conduct in the receive mode of operation.

4. The network of claim 2 wherein the filter means comprises a high pass filter.

5. The network of claim 1 including a single-pole, double-throw relay having normally closed contacts coupling the second filter junction point to the receiver and normally open contacts closable to complete the coupling of the transmitter output to the antenna only in the transmit mode of operation.

6. A method of allowing the same printed antenna coupling circuit to be used in different transceivers, some having relay antenna switching and others having solid state antenna switching which comprises:
    providing a printed circuit having electrical components forming a band pass filter for coupling transmitter output to an antenna at least during a transmit mode of transceiver operation;
    providing first and second terminals on the printed circuit connected to distinct first and second junctions in the filter intermediate the transmitter output and the antenna;
    coupling the receiver input directly to one of the first and second terminals at least during a receive mode of transceiver operation; and
    providing a third terminal on the printed circuit to be permanently connected to the transmitter output and to be permanently connected to the second printed circuit terminal only if the receiver input is coupled to the first printed circuit terminal, the third printed circuit terminal being connected to the second printed circuit terminal only during the transmit mode of operation when the receiver input is coupled to the second printed circuit terminal only during the receive mode of operation.

* * * * *